US012631301B2

(12) United States Patent
Wang et al.

(10) Patent No.: US 12,631,301 B2
(45) Date of Patent: May 19, 2026

(54) LAMP

(71) Applicant: SIGNIFY HOLDING B.V., Eindhoven (NL)

(72) Inventors: Huansi Wang, Shanghai (CN); Xue Yan Liang, Shanghai (CN)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 19/104,441

(22) PCT Filed: Aug. 10, 2023

(86) PCT No.: PCT/EP2023/072133

§ 371 (c)(1),
(2) Date: Feb. 18, 2025

(87) PCT Pub. No.: WO2024/037957

PCT Pub. Date: Feb. 22, 2024

(65) Prior Publication Data

US 2026/0055857 A1 Feb. 26, 2026

(30) Foreign Application Priority Data

Aug. 18, 2022 (WO) ................ PCT/CN2022/113227

(51) Int. Cl.

| | |
|---|---|
| ***F21K 9/69*** | (2016.01) |
| ***F21K 9/233*** | (2016.01) |
| ***F21K 9/68*** | (2016.01) |
| ***F21V 17/16*** | (2006.01) |
| ***F21Y 115/10*** | (2016.01) |

(52) U.S. Cl.

CPC ................ *F21K 9/69* (2016.08); *F21K 9/233* (2016.08); *F21K 9/68* (2016.08); *F21V 17/164* (2013.01); *F21Y 2115/10* (2016.08)

(58) Field of Classification Search

CPC ........................................................ F21K 9/233

See application file for complete search history.

(56) References Cited

U.S. PATENT DOCUMENTS

| | | | | |
|---|---|---|---|---|
| 10,677,415 | B1* | 6/2020 | Zhao | F21V 17/002 |
| 2007/0274081 | A1 | 11/2007 | Engel | |
| 2011/0044057 | A1* | 2/2011 | Foo | F21K 9/23 362/311.06 |
| 2017/0254525 | A1* | 9/2017 | Klafta | F21V 23/005 |
| 2018/0038557 | A1 | 2/2018 | Klafta et al. | |
| 2021/0102669 | A1* | 4/2021 | Xiong | F21K 9/90 |

FOREIGN PATENT DOCUMENTS

| | | | |
|---|---|---|---|
| CN | 203215564 | U | 9/2013 |
| CN | 205424829 | U | 8/2016 |
| DE | 102004024599 | A1 | 12/2005 |
| EP | 3521694 | A1 | 8/2019 |

* cited by examiner

*Primary Examiner* — Eric T Eide

(57) ABSTRACT

A lamp (100) having a housing (130) with a translucent or transparent portion (133). The housing encloses a light emitting arrangement (110) and supports a lens (120) that covers a light exit window (131) of the housing (130). The width of the lens is greater than the width of the light exit window. A transmissive (i.e., translucent or transparent) portion (133) of the housing (130) is configured to transmit light through to the lens (120).

15 Claims, 3 Drawing Sheets

LAMP

CROSS-REFERENCE TO PRIOR APPLICATIONS

This application is the U.S. National Phase application under 35 U.S.C. § 371 of International Application No. PCT/EP2023/072133, filed on Aug. 10, 2023, which claims the benefit of International Application No. PCT/CN2022/113227, filed on Aug. 18, 2022. These applications are hereby incorporated by reference herein.

FIELD OF THE INVENTION

The present invention relates to the field of lighting, and in particular to the field of lamps for use in a luminaire or lighting fixture.

BACKGROUND OF THE INVENTION

There is a widespread and increasing using of artificial lights to illuminate an environment. One increasingly common form of an artificial light makes use of a lamp, which houses a lighting emitting arrangement, which may comprise one or more LEDs. Light bulbs are examples of lamps.

To ensure consistency and configurability of lamps, it is common for lamps to adhere to one or more standards, such as the GU-10 standard or GZ-10 standard. This ensures that new lamps can be fitted into existing light fixtures or luminaires. However, one problem with this requirement is limitations in design flexibility, as any such lamps should meet certain predetermined design requirements.

There is therefore a desire for improved and/or more efficient lamps that are still able to fit in existing light fixtures and/or adhere to existing lamp standards.

SUMMARY OF THE INVENTION

The invention is defined by the claims.

According to examples in accordance with an aspect of the invention, there is provided a lamp comprising: a light emitting arrangement configured to emit light; a lens, configured to receive light emitted by the light emitting arrangement; and a housing that houses the light emitting arrangement and supports the lens.

The housing comprises: a light exit window through which light emitted by the light emitting arrangement is able to exit the housing, wherein the lens is positioned to cover the light exit window; an edge bounding the light exit window; and a transmissive portion adjacent to the edge, the transmissive portion being formed of a transparent and/or translucent material. The width of the lens is greater than the width of the light exit window. The transmissive portion and lens are configured and positioned such that at least a portion of light, originally emitted by the light emitting arrangement and incident upon the transmissive portion, is transmitted to the lens.

The proposed invention makes use of a transmissive portion of the housing to increase the effective size of the light exit window. This allows the use of a larger lens for increasing the design and configuration flexibility of the lens, which leads to improved optical characteristics of light output by the lamp, including an efficiency increase of up to 1%. In particular, the proposed approach allows for larger lenses to be used with a lamp (e.g., for improving optical efficiency) without affecting that lamps ability to adhere to existing lamp standards, such as the GU-10 or GZ-10 standard.

The edge of the housing may be configured to support the lens to cover the light exit window. Thus, the edge of the housing may act as the support for the lens. This provides a simple and easy-to-install approach for assembling the lens to the lamp, as well as maximizing an available size for the lens.

The lens may comprise a snap-fit arrangement configured to couple to the edge of the housing using a snap-fit mechanism. This provides a system that is easy to assemble and maintains a compact size for the lamp.

The transmissive portion of the housing may extend the entire way around the edge of the housing. This increases a uniformity of the light that is transmitted to the lens via the transmissive portion, and thereby a uniformity of the light output by the lamp.

The transmissive portion of the housing may include the edge of the housing. This provides a close optical coupling between the transmissive portion and the lens (mounted to cover the light exit window) to reduce the amount of stray light or light absorption by other components of the lamp.

The height of the transmissive portion of the housing, from a point of the edge most distant from the light emitting element towards the light emitting arrangement, may be no less than 3 mm, e.g., no less than 4 mm, e.g., 5 mm.

In some examples, the width of the lens is greater than the sum of the width of the light exit window and two times the thickness of the edge of the housing. This provides a larger lens for even greater flexibility in lens design and configuration.

The transmissive portion of the housing may be formed of a transmissive plastic or glass. For instance, the transmissive plastic or glass may be transparent or translucent.

In some examples, the lamp further comprises a reflector, positioned between the light emitting arrangement and the transmissive portion, configured to direct light emitted by the light emitting arrangement towards the light exit window and/the or transmissive portion of the housing. The reflector may be configured to avoid covering the transmissive portion of the housing, to permit light directed towards the transmissive portion to be received and transmitted therethrough.

The reflector may comprise a layer of reflective material coated on an inner sidewall of the housing. This provides a compact and cost effective approach for providing a reflector within a lamp.

In some examples, the housing is formed of a single material. This reduces the manufacturing complexity and material cost for producing the housing.

The reflective material is preferably a specular metal coating or diffusive metal-oxidate coating. This improves the uniformity of light output by the lamp by performing discussion and/or scattering of light within the housing itself.

The lamp may be configured as a GU-10 or GZ-10 lamp. This may require appropriate sizing and/or structuring of elements of the lamp, particularly the housing, as well inclusion of appropriate electrical connectors for meeting the GU-10 or GZ-10 standard.

The light emitting arrangement may comprise one or more LEDs. LEDs provide efficient and straightforward light emitting elements for the lamp.

There is also proposed a lighting fixture comprising any herein described lamp. In particular, the lighting fixture may comprise one or more herein described lamps as well as one or more sockets each configured to receive a lamp.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
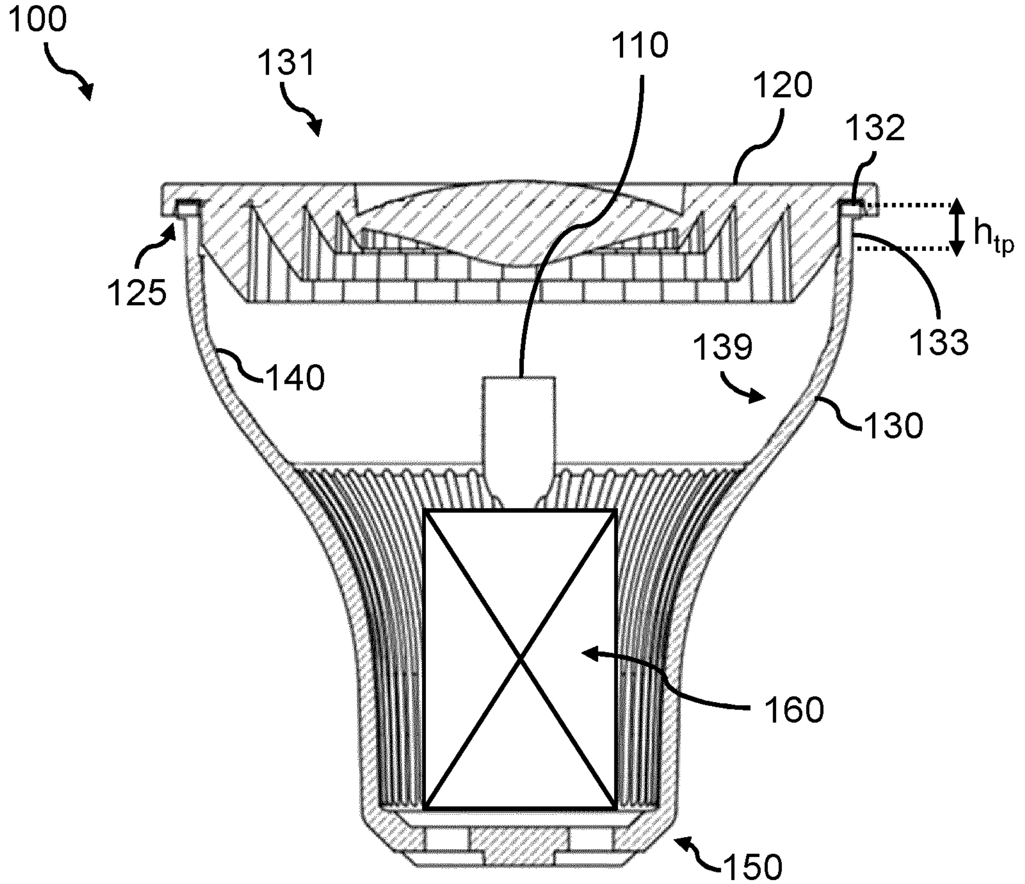
FIG. 1 provides a cross-sectional view of a lamp.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The present disclosure provides a lamp having a housing with a translucent or transparent portion. The housing encloses a light emitting arrangement and supports a lens that covers a light exit window of the housing. The width of the lens is greater than the width of the light exit window. A transmissive (i.e., translucent or transparent) portion of the housing is configured to transmit light through to the lens.

Proposed approaches are based on the realization that a larger lens can be used for a lamp if a part of the housing for the lamp in the vicinity of the lens is transparent/translucent. This increases the effective size of the light exit window without needing to increase the size of the housing.

Embodiments can be employed in any lighting fixture that makes use of lamps, but finds particular use in downlights and lighting devices that have a restricted or predetermined cavity in which a lamp can be received.

FIG. 1 provides a cross-sectional view of a lamp 100, e.g., for a lighting fixture. The lamp 100 comprises a light emitting arrangement 110, a lens 120 and a housing 130.

The light emitting arrangement 110 is configured to emit light, and may comprise one or more light emitting elements. Examples of suitable light emitting elements will be readily apparent to the skilled person, and include light emitting diodes (LEDs) as well as halogen bulbs.

The lens 120 is configured to receive light emitted by the light emitting arrangement 110. The lens 120 may control or modify the optical properties of received light, e.g., to perform beam-shaping on received light, diffuse received light and/or filter received light. The illustrated lens 120 is a Fresnel lens, but other forms of lenses could be used to advantage. For instance, the lens may instead comprise a planar substrate (e.g., formed of transparent or diffusive material) that has been coated with, or etched to create, microstructures that are configured to modify the optical properties of light passing therethrough.

The housing 130 is configured to house the light emitting arrangement 110. Thus, the light emitting arrangement is located within an interior of the housing, e.g., within an inner/interior sidewall 139 of the housing.

The housing 130 is also configured to support the lens 120. For instance, the housing may mechanically couple to the lens to provide structural support to the lens 120.

The housing 130 defines a light exit window 131, through which light emitted by the light emitting arrangement 110 is able to exit the housing. In particular, the light exit window 131 may comprise an aperture or space in the housing (e.g., an air gap of the housing) through which light is able to exit or escape the housing 130.

The illustrated housing 130 has a tapered shape, in which the light exit window 131 is positioned at the widest part of the housing (the "top" of the housing). Thus, the housing 130 tapers from the light exit window to a base or mount 150 of the lamp 100. The base or mount 150 is configured for connecting the lamp to a socket. This structure/shape is well established in the art of lamps, but is not essential to the proposed inventive concept.

The light exit window 131 may have an oval or circular shape. These shapes have been identified as providing a more uniform distribution of light when output by the lamp 100.

The light exit window 131 is bounded by an edge 132 of the housing. Thus, the shape and size of the edge 132 defines the shape and size of the light exit window 131.

The lens 120 is positioned to cover the light exit window 131. Thus, light that passes through the light exit window 131 is incident upon the lens 120. This allows the lens 120 to provide the relevant or desired optical characteristics to light generated by the light emitting arrangement 110.

In some examples, the lens 120 extends or partially extends into the housing 130, whilst still covering the light exit window 131. This can provide a more compact lamp 100. In other examples, the lens may sit or rest above the housing 130.

The present disclosure proposes the use of a lens 120 that is wider (e.g., in radius and/or diameter) than the light exit window 131. In a conventional lamp, if a wider lens were to be used, then the areas/regions that do not directly cover the light exit window would only receive light from other regions of the lens. The effectiveness of the non-covering parts of the lens is therefore affected.

To at least partially overcome this issue, the proposed approach provides a transmissive portion 133 of the housing 130. Thus, a part 133 of the housing 130 is at least partially transparent. The transmissive portion 133 is formed of a transparent and/or translucent material (i.e., a partially or fully transmissive material). The lens 120 and transmissive portion 133 are positioned and configured such that at least some of the light that is incident upon the transmissive portion 133 (e.g., from the light emitting arrangement 110) is transmitted to the lens 120.

The proposed approach thereby increases the effective size of the light exit window 131, permitting a larger lens 120 to be used to greater effect. In particular, the size of the light exit window 131 is increased at least by the thickness of the transmissive portion 133. In particular, the brim or edge of the lens 120 can also be used to control the optical properties of light emitted by the lamp 100. This provides greater flexibility in control and design of the lens 120 for achieving desired optical characteristics for the lamp.

The use of a larger lens 120 may, for instance, facilitate designs that are able to increase the effective flux of light emitted by the lamp 100. The effective flux is defined as the flux of light output by the lamp within a region that makes an angle of ±45° to the optical axis of the lamp (e.g., relative to the overall or total flux of light output by the lamp).

The transmissive portion 133 is positioned adjacent to the edge 132 of the housing 130. This appropriately positions and configures the transmissive portion 133 for transmitting light to the lens 120, i.e., by providing a close optical coupling between the transmissive portion 133 and the lens 120.

In the context of the present invention, a translucent or transparent material can be alternatively labelled a transmissive material (which therefore comprises any translucent or transparent material). Examples of suitable transmissive material are known in the art. In some examples, the transmissive material includes a transmissive plastic or glass, which are able to provide the necessary transmittance and structural rigidity for supporting the lens 120. In preferred examples, the transmissive material comprises transparent plastic or glass.

The length or height $h_{tp}$ of the transmissive portion 133 of the housing 130, from a point of the edge 132 most distant from the light emitting element 110 towards the light emitting arrangement, may be no less than 4 mm, e.g., 5 mm. This provides sufficient space for transmittal of light to the lens 120 from the interior of the housing without significantly increasing light escape from the lens.

In some examples, the transmissive portion 133 may be configured to direct light towards the lens 120. This can be achieved through appropriate selection of the size and/or shape of the transmissive portion. This approach increases the amount of light transmitted to the lens, increasingly the effective usable size of the lens.

The use of the transmissive portion 133 effectively or conceptually splits the lens 120 into two portions, a first portion that receives light via the light exit window 131 and a second portion that receives light via the transmissive portion 133 of the housing 130. The effective/usable size of the lens 120 is thereby increased by the second portion.

Figure 2:
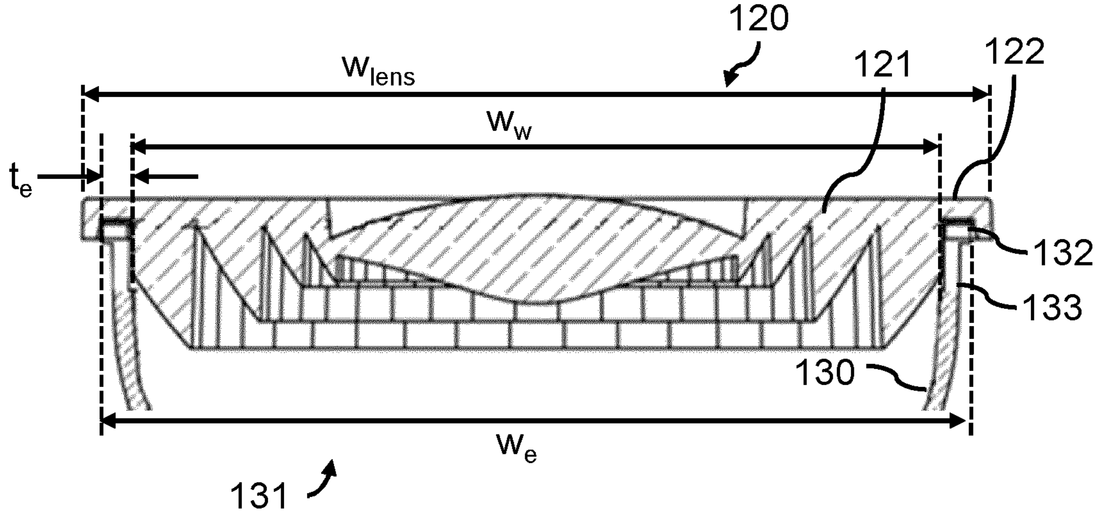
FIG. 2 provides a cross-sectional view of a lens and a portion of a housing for the lamp.

As previously explained, the width $w_{lens}$ of the lens 125 is greater than the width $w_w$ of the light exit window 131. This relationship is further illustrated in FIG. 2, which provides a cross-sectional view of the lens 120, together with a portion of the housing 130.

The lens 120 has a width $w_{lens}$. The width $w_{lens}$ of the lens is greater than the width $w_w$ of the light exit window 131.

Where the lens 120 is circular or cylindrical, the width $w_{lens}$ is equivalent to the diameter of the lens. Similarly, where the light exit window 131 has a circular shape, the width $w_w$ of the light exit window is the diameter of the light exit window.

The lens 120 comprises a first portion 121 configured to cover the light exit window, i.e., having a same width, size and/or shape as the light exit window. In particular, the first portion 121 directly receives light from the light exit window. In some examples, the first portion 121 is configured to fit into or plug the light exit window. The width of the first portion may therefore be similar/identical to the width of the light exit window.

The lens 120 also comprises a second portion 122 that does not cover the light exit window. Thus, the second portion does not receive light directly via the light exit window (unlike the first portion 121). Rather, the second portion receives light via the transmissive portion 133 of the housing 130. It will be appreciated that the second portion 122 surrounds the first portion 121, and can thereby be considered to form a rim of the lens 120.

In particularly preferable examples, and as illustrated, the width $w_{lens}$ of the lens is greater than the sum of the width $w_w$ of the light exit window and two times the thickness $t_e$ of the edge of the housing. In this way, the width $w_{lens}$ of the lens is greater than the width $w_e$ of the edge of the housing (which may effectively be the maximum width of the housing).

However, this is not essential. In some cases, the width of the lens is equal to or less than the sum of the width $w_w$ of the light exit window and two times the thickness $t_e$ of the edge of the housing. This still provides an advantage of increased effective lens size compared to conventional lamps.

The effect of the proposed concept has been experimentally tested. In particular, lamps having the structure illustrated in FIG. 1, but with different lens widths, have been experimentally tested to assess the effective flux of light emitted by the lamp. The effective flux is measured as a percentage (%), representing the percentage of the flux of all light emitted by the lamp that is contained within a region that makes an angle of ±45° to the optical axis of the lamp.

The greater the effective flux, the more useful or beneficial the light emitted by the lamp. Thus, the greater the effective flux, the greater the optical efficiency of the lamp.

In a first set of samples, the width of the lens is equal to the width of the light exit window. In a second set of samples, the width of the lens is greater than the width of the light exit window (e.g., having the precise structure illustrated in FIG. 1). In both sample sets, there are two types of lamp, with different types having light emitting arrangements that output light of different color temperatures (measured in kelvin K). This is used as a control variable.

Table 1 sets out the results of this experimentation. As clearly demonstrated, there is an increase (of up to 1%) in the effective flux for embodiments in which the width of the lens is greater than the width of the light exit window.

TABLE 1

| | | Effective Flux | |
|---|---|---|---|
| Color Temperature (K) | Sample No. | $w_{lens} = w_w$ (%) | $w_{lens} > w_w$ (%) |
| 3000 | 1 | 92.92 | 93.63 |
| | 2 | 92.94 | 93.57 |
| | Average | 92.93 | 93.60 |
| 4000 | 1 | 92.64 | 93.53 |
| | 2 | 92.82 | 93.65 |
| | 3 | 92.86 | 93.98 |
| | Average | 92.78 | 93.72 |

Turning back to FIG. 1, further optional features of the lamp 100 are hereafter described.

The transmissive portion 133 may extend the entire way around the edge 132 of the housing 130. Thus, the transmissive portion 133 may follow the edge 132 of the housing 130. This increases the amount of light that can be transmitted to the lens 120 through the transmissive portion, and ensures that such light is uniformly provided to the lens 120 to improve a uniformity of output light.

The edge 132 of the housing 130 may be configured to support the lens 120 to cover the light exit window 131. In particular, the lens and edge may be together configured to couple to each other, to thereby mechanically secure the lens to the housing.

The transmissive portion 133 may comprise or form the edge 132. Thus, the edge may be formed from the transmissive (i.e., transparent/translucent) material. This provides closer optical coupling between the transmissive portion 133 and the lens 120 (e.g., coupled to the edge) for improved optical coupling of light emitted by the light emitting arrangement into the lens 120.

In a preferred example, the lens 120 comprises a snap-fit arrangement 125 configured to couple to the edge of the housing using a snap-fit mechanism. A snap-fit arrangement facilitates a compact connecting mechanism with increase ease of assembly. Through the snap-fit arrangement 125, the lens 120 will geometrically co-operate with the edge 132 of the housing 130 in order to mechanically couple thereto.

Figure 3:
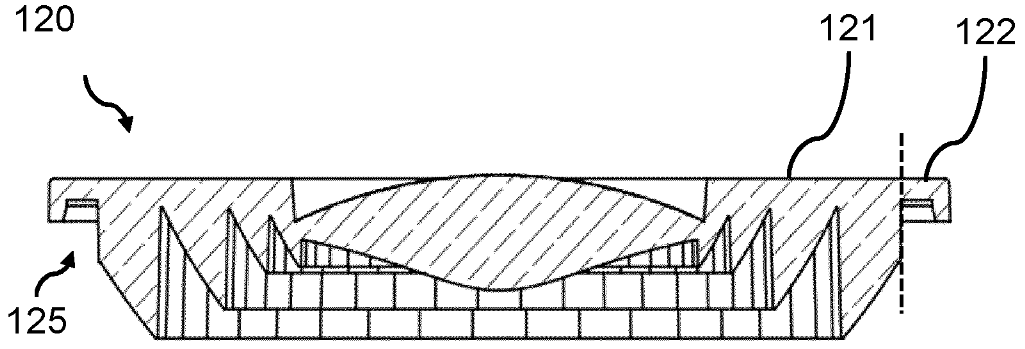
FIG. 3 provides a cross-sectional view of a lens.

FIG. 3 provides a cross-sectional view of the lens 120, that more clearly illustrates the shape of the snap-fit arrangement 125. In particular, the snap-fit arrangement may be formed of an elastic material or structure configured to engage or clip with the edge (not shown) of the housing.

Of course, alternative coupling mechanisms could be used in place of a snap-fit arrangement, such as adhesive or a screw-based system.

FIG. 3 also more clearly illustrates the conceptual separation between the first 121 and second 122 portions of the lens 120.

Referring again to FIG. 1, the lamp 100 may further comprise a reflector 140. The reflector 140 is positioned between the light emitting arrangement 110 and the transmissive portion 133. The reflector 140 is configured to direct light emitted by the light emitting arrangement 110 towards the light exit window 131 and/the or transmissive portion 133 of the housing 130. Of course, the reflector 140 is absent or not present in the region of the transmissive portion 133.

In the illustrated example, the reflector 140 is a layer or coating of reflective material located on an inner sidewall 139 of the housing 130. Thus, the reflector 140 coats a surface of the housing 130 that faces an interior of the housing 130, e.g., faces the light emitting arrangement 110.

The reflective material may comprise a specular metal coating, such as silver, aluminum, nickel or chromium. In some examples, the reflective material comprises a diffusive metal-oxidate coating, such as $TiO_2BaSO_4$, or mica powder.

However, other embodiments for a reflector 140 will be apparent to the skilled person, e.g., a separate or dedicated structure (such as a metal/reflective insert) for the housing 130.

In embodiments comprising a reflector 140, it is preferable that the housing 130 is formed of a single material, e.g., a single transparent/translucent material. The reflector 140 can then be provided to cover part of the interior surface or inner sidewall 139 of the housing 130. By way of example, the reflector 140 can be formed by coating the interior of such a housing 130 with a reflective coating. In this way, the location/shape of the transmissive portion 133 of the housing 130 is defined as the portion of the housing that is not covered or obscured by the reflector 140. This approach facilitates increased ease of manufacturing the lamp, as the housing can be created in a single manufacturing process.

Figure 4:
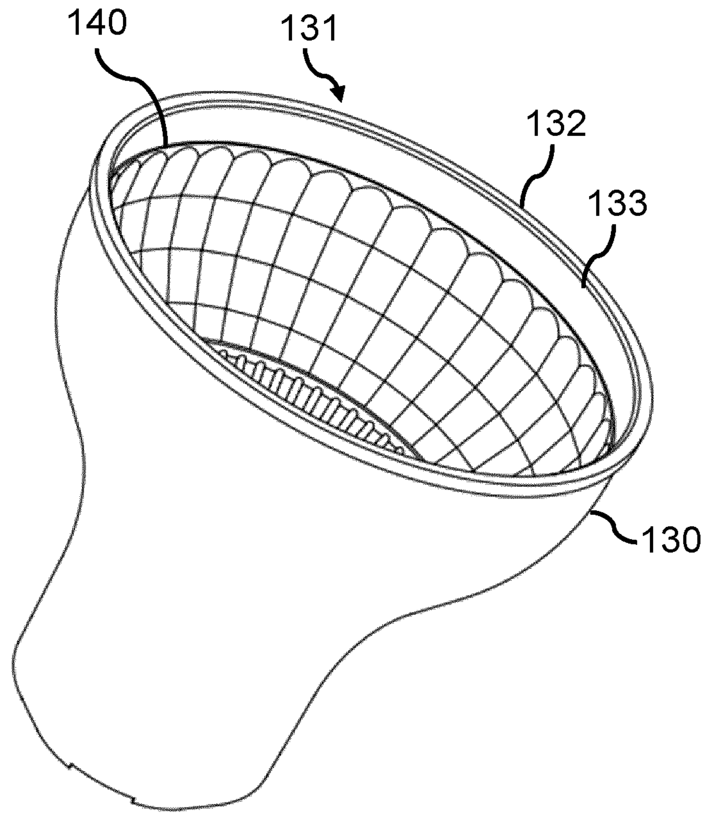
FIG. 4 provides a perspective view of a housing and reflector.

FIG. 4 illustrates a housing 130 and reflector 140. This Figure clearly demonstrates the relative location of the reflector 140 within the housing 130, specifically to cover an inner sidewall of the housing, as well as demonstrating how the reflector 140 does not cover or avoids covering the transmissive portion 133 of the housing.

As best shown in FIG. 4, the reflector 140 may be made or formed of a plurality of facets. These facets may allow better light mixing thus increasing the output uniformity.

Referring back to FIG. 1, the lamp 100 may be configured as a GU-10 or GZ-10 lamp. Thus, the base 150 of the lamp 100 may comprise an electrical connector configured for connection to a GU-10 or GZ-10 socket. The electrical connector may therefore comprise two appropriately configured pins for connection to a GU-10 or GZ-10 socket. Of course, the shape and/or size of the base 150 of the lamp may similarly be appropriate sized and configured for connection into a GU-10 or GZ-10 socket.

GU-10 and GZ-10 are well-established standards in the field of lamps and lighting fixtures.

Any herein described lamp may comprise additional components 160, which may be configured for powering, driving and/or controlling the operation of the light emitting arrangement. The additional components 160 have been illustrated in an abstract form, as the precise arrangement and/or configuration of these components is immaterial to the proposed approach. Such components are well known in the art, and are not described for the sake of conciseness.

Figure 5:
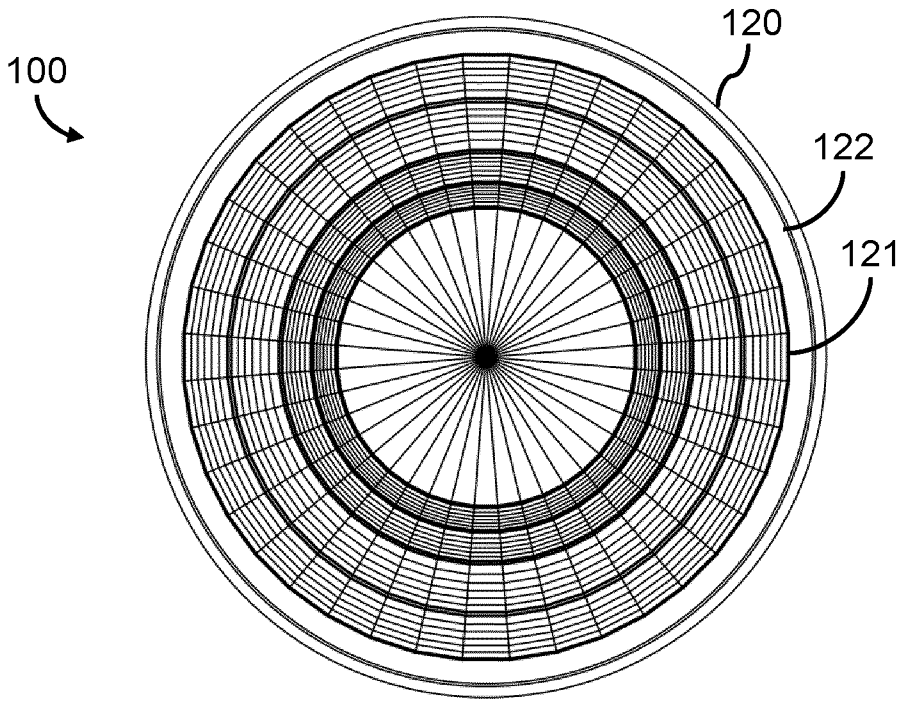
FIG. 5 provides a top-down view of the lamp.

FIG. 5 provides a top-down view of the lamp 100, which provides a view of the lens 120. This Figure demonstrates the first portion 121 (covering the light exit window) and the second portion (not covering the light exit window) of the lens 120. As illustrated, the lens may be configured as a Fresnel lens. As shown in the Figures, sidewalls of the lens 120 may include a plurality of facets, such facets may allow better light mixing thus increasing the output uniformity.

Figure 6:
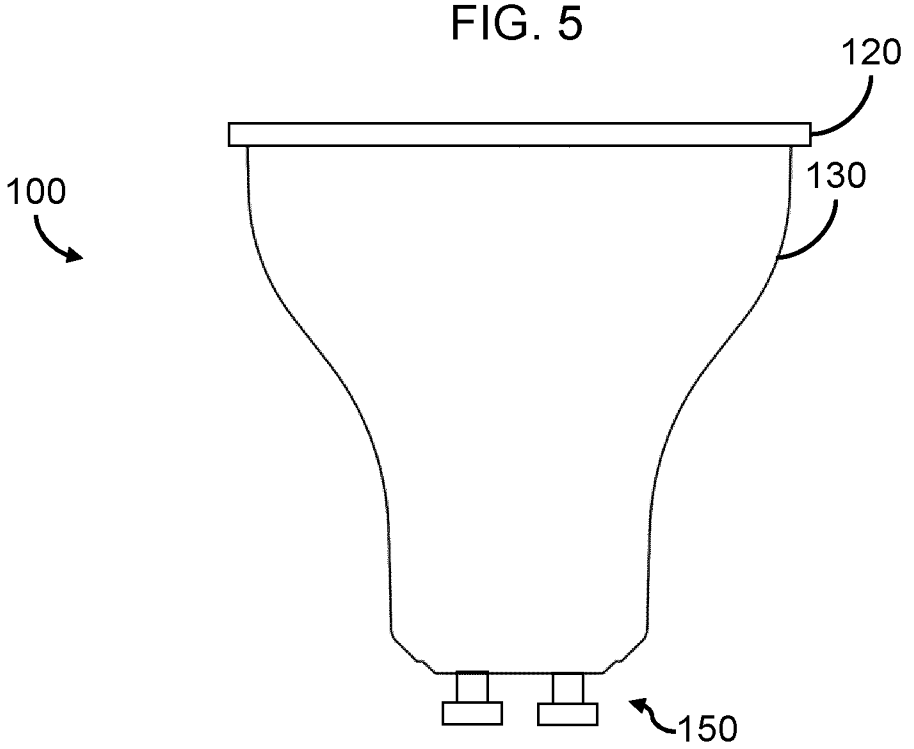
FIG. 6 provides a side view of the lamp.

FIG. 6 provides a side view of the lamp 100. This view clearly demonstrates how the width of the lens 120 can be larger than the (maximum) width of the housing 130, i.e., larger than the light exit window.

This Figure also demonstrates how an electrical connector may be formed in/at the base 150 of the housing 100. The electrical connector may be configured for use with a GU-10 or GZ-10 socket.

The lamp is configured for use in a lighting fixture. Accordingly, there is also proposed a lighting fixture comprising any herein described lamp. Such a lighting fixture may comprise at least one herein described lamp and at least one socket configured for receiving a herein described lamp. There is also proposed a luminaire comprising such a lighting fixture.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. A lamp comprising:

a light emitting arrangement configured to emit light;

a lens, configured to receive light emitted by the light emitting arrangement; and a housing that houses the light emitting arrangement and supports the lens, the housing comprising:
a light exit window through which light emitted by the light emitting arrangement is able to exit the housing, wherein the lens is positioned to cover the light exit window;
an edge bounding the light exit window; and
a transmissive portion adjacent to the edge, the transmissive portion being formed of a transparent and/or translucent material,
wherein the width of the lens is greater than the width of the light exit window,
wherein the transmissive portion and lens are configured and positioned such that at least a portion of light, originally emitted by the light emitting arrangement and incident upon the transmissive portion, is transmitted to the lens.

2. The lamp of claim 1 wherein the edge of the housing supports the lens to cover the light exit window.

3. The lamp of claim 2, wherein the lens comprises a snap-fit arrangement configured to couple to the edge of the housing using a snap-fit mechanism.

4. The lamp of claim 1, wherein the transmissive portion of the housing extends the entire way around the edge of the housing.

5. The lamp of claim 1, wherein the transmissive portion of the housing includes the edge of the housing.

6. The lamp of claim 5, wherein the height of the transmissive portion of the housing, from a point of the edge most distant from the light emitting element towards the light emitting arrangement, is no less than 4 mm.

7. The lamp of claim 1, wherein the width of the lens is greater than the sum of the width of the light exit window and two times the thickness of the edge of the housing.

8. The lamp of claim 1, wherein the transmissive portion of the housing is formed of a transmissive plastic or glass.

9. The lamp of claim 8, wherein the transmissive plastic or glass is transparent.

10. The lamp of claim 1, further comprising a reflector, positioned between the light emitting arrangement and the transmissive portion, configured to direct light emitted by the light emitting arrangement towards the light exit window and/the or transmissive portion of the housing.

11. The lamp of claim 10, wherein:
the housing is formed of a single material; and
the reflector is a layer of reflective material coated on an inner sidewall of the housing.

12. The lamp of claim 11, wherein the reflective material is a specular metal coating or diffusive metal-oxidate coating.

13. The lamp of any of claims 1 to 12, configured as a GU-10 or GZ-10 lamp.

14. The lamp of claim 1, wherein the light emitting arrangement comprises one or more LEDs.

15. A lighting fixture comprising the lamp of claim 1.

* * * * *